Aug. 4, 1925.
E. D. JONES
KNOCKDOWN HARROW
Filed Oct. 10, 1924
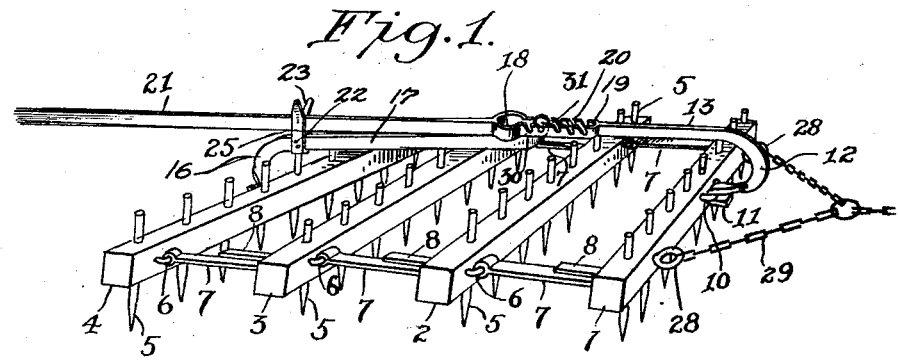
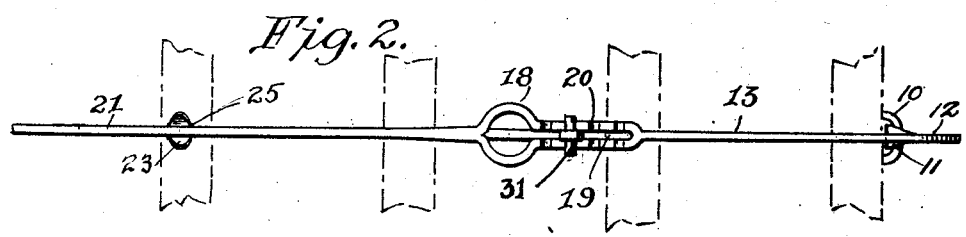
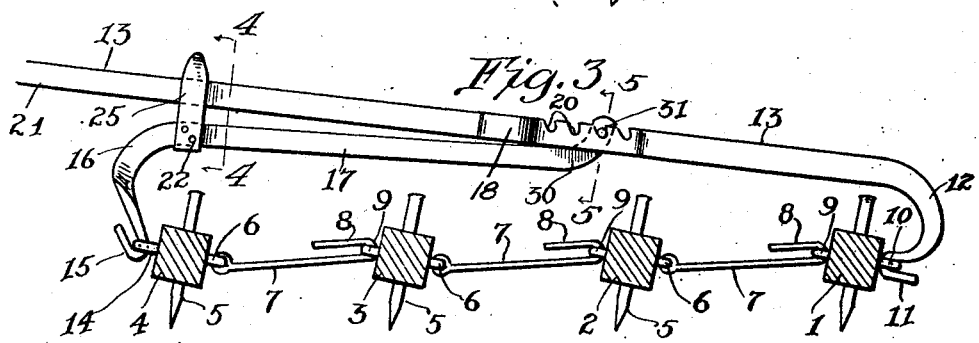
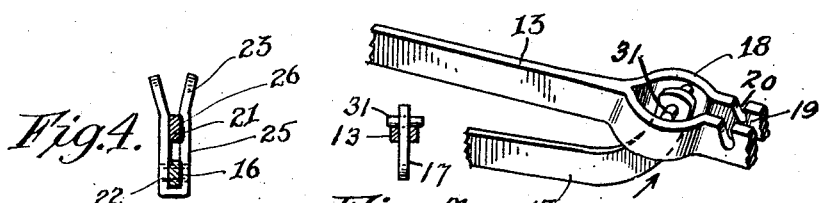
Inventor
E. D. Jones by
Attorney Patented Aug. 4, 1925.

1,548,196

UNITED STATES PATENT OFFICE.

EDGAR D. JONES, OF GALLATIN, TENNESSEE.

KNOCKDOWN HARROW.

Application filed October 10, 1924. Serial No. 742,755.

*To all whom it may concern:*

Be it known that I, EDGAR D. JONES, a citizen of the United States, residing at Gallatin, in the county of Sumner and State of Tennessee, have invented certain new and useful Improvements in Knockdown Harrows; and I do hereby declare the following to be a full, clear, and exact description of the invention, such as will enable others skilled in the art to which it appertains to make and use the same.

This invention relates to knockdown harrows and has for its object to improve the constructions permitting of the ready assembling and disassembling of the parts of harrows, heretofore proposed.

With these and other objects in view, the invention consists in the novel parts and combinations of parts constituting my improved harrow, all as will be hereinafter more fully disclosed and particularly pointed out in the claims.

Referring to the accompanying drawings forming a part of the specification, in which like numerals designate like parts in all the views:—

Figure 1 is a perspective view showing my improved harrow with its parts assembled and ready for use;

Figure 2 is a fragmentary plan view illustrating the engagement of the toggle levers of my harrow;

Figure 3 is a longitudinal sectional view illustrating the readily detachable relations of the parts of my harrow when assembled for use;

Figure 4 is a detail transverse sectional view taken on the line 4—4 of Fig. 3, looking in the direction of the arrows;

Figure 5 is a sectional view taken on the line 5—5 of Fig. 3, looking in the direction of the arrows; and Figure 6 is a perspective view illustrating the engaging relation of portions of the two toggle levers.

1, 2, 3 and 4 indicate a plurality of harrow beams provided with harrow teeth 5 passing therethrough, 6 indicates a plurality of fastenings secured to said beams and permanently holding the connecting links 7 provided with the turned over hook-shaped ends 8 as illustrated. On the side of each beam opposite to that occupied by the fastenings 6 are similar loop-like fastenings 9 into which take the hooks 8 of a succeeding beam, and thus are the various beams 1 to 4 detachably and reliably secured together, as will be clear from Figs. 1 and 3 of the drawings.

On the outside of the beam 1 there is provided a loop-like fastening means 10 in which takes the hook 11 of the gooseneck shaped end 12 of the lever 13. Likewise on the outside of the outer beam 4 is a loop-like fastening 14 in which takes the hook 15 of the gooseneck end 16 of the lever 17. The lever 13 is provided with a circular loop-like eye member 18, as best illustrated in Fig. 2, and from one side of the loop 18 extends a slot 19, the walls of which are provided with notches 20, as shown. The lever 17 is provided with any suitable spring catch fastening adapted to readily engage and disengage the extended end of the handle portion 21 of the lever 13.

In the example shown, this spring catch member 25 is composed of a U-shaped member secured as at 22, to the lever end 16, and with its extending U ends flared as indicated at 23, to readily receive the handle portions 21 of said lever 13. One of the members 23 of the catch 25 is provided with a notch 26 illustrated in Fig. 4, for the purpose of holding the handle end 21 of the lever 13 in place, although said notch 26 is not sufficiently deep to prevent said handle from being readily jerked out of its held position when desired. The harrow may be provided with any suitable draft means such as 28, to which any desired attachment 29 may be secured for the purpose of dragging the harrow over a field.

It will be understood that the members lettered from 6 to 9 are preferably duplicated at each end of the harrow beams as will be apparent from an inspection of Fig. 1. In assembling this harrow, it will be clear that since the link members 7 are permanently attached at their inner ends to their corresponding harrow beams, and are provided with hook members 8 at their outer ends, said members 7 of a succeeding beam 3, may be readily hooked into the holding members 9 of a preceding beam 2, and in the same manner may all the harrow beams 1, 2, 3 and 4 be readily secured together for use as a complete harrow. It will be further apparent that the hook 11 of the lever 13 may be readily engaged in its eye fastening member 10 and that the hook 15 of the lever 17 may likewise be readily engaged with its corresponding loop fastening member 14, whereupon the curved outer end 30 of said lever 17 carrying the cross-pin 31 may be readily inserted through the circular eye-shaped portions 18 of the lever 13 and said pin 31 readily engaged in one of the notches 20 with which said lever 13 is provided.

When the parts are in the positions just described, if the extended handle portion 21 of the lever 13 be brought down to engagement with the notch 26 in the catch member 25, the harrow will be completely assembled in a flexible yet firm and dependable condition suitable for operation.

On the other hand, when it is desired to disassemble the parts of this harrow, it is only necessary to move the handle portion 21 of the lever 13 upwardly and out of engagement with the snap catch 25, whereupon the pin 31 may be readily disengaged from its notch 20 in said lever 13 and brought out of engagement with the eye portion 18 of the lever 13, when the two levers 13 and 17 will be disengaged entirely from each other. When this happens the hook 11 of the end 12 of the lever 13 may be readily disengaged from its loop fastening 10, and the hook 15 of the lever 17 may likewise be readily disengaged from its corresponding fastening 14, so that said levers 13 and 17 will be entirely separated from the harrow. After this is accomplished it is a comparatively easy matter to disengage each of the hooks 8 of the members 7 from their corresponding securing members 9, and thus to disengage each of the harrow beams 1, 2, 3 and 4 from each other.

It will now be clear that the parts of this harrow may be thus readily assembled and disassembled without the use of a nut, bolt, or cotter pin, or other individual fastening which is liable to be lost; and, further, it will be clear that the operation of assembling and disassembling the parts of this knockdown harrow may be readily performed in a much less time and with much less trouble than is the case with those harrows which employ bolts, nuts, etc., as fastening members. Due to the fact that all the small movable fastenings are permanently secured to the harrow beams, it is not possible to misplace, nor lose them when taking the harrow apart, and due to the fact that hook-like fastenings are adopted throughout, a strong and dependable construction results.

It will still further be observed that since the beams 2 and 3 are flexibly secured together and to the beams 1 and 4, upon power being applied to the draft gear 29, the teeth of the beam 1 will assume a more or less vertical position, while the thrust exerted by the lever 13 through the pin 31 on the lever 17, will cause the teeth 5 of the beam 4, to likewise assume a more or less vertical position. In the meantime, the teeth 5 of said beams 2 and 3 will assume a more or less inclined position. This constitutes an advantage in the operation of the harrow, for the above-mentioned loose connections enable the harrow beams to "give," when obstructions or abnormal resistances are encountered, and also facilitates the clearing of weeds therefrom.

In addition to the above, should it be desired to vary the degree of flexibility or looseness possessed by the parts after being joined together, it is only necessary to shift the pin 31 to the right or left as seen in Fig. 3, so as to engage a different notch 20, for should it occupy the notch on the extreme right of the series of notches, the hooks 11 and 15, or the outer beams 1 and 4 will be brought closer together and a maximum of looseness between the beams and the members 7 will result. On the other hand, if the pin 31 occupy the notch on the extreme left of the series, said beams 1 and 4 will be moved away from each other and a maximum stiffness of the joints between the beams will result. In this manner the harrow can be readily given that degree of flexibility that is found to be the most suitable for the particular condition of the ground being treated. Of course, it is obvious that a greater or less number of beams than that disclosed may be employed, and other changes made without departing from the spirit of the invention, therefore I do not wish to be limited to the foregoing disclosure except as may be required by the claims.

What I claim is:

1. In a knockdown harrow capable of being readily assembled and dis-assembled, the combination of a plurality of harrow beams; readily attachable and detachable connections between said beams; a lever attached to one of the outer beams of the harrow; a lever attached to the other outer beam of the harrow; notched means associated with said levers for connecting them together in the form of a toggle; and means to secure the toggle in its final holding position.

2. In a knockdown harrow capable of being readily assembled and dis-assembled, the combination of a plurality of harrow beams; readily attachable and detachable connections between said beams; a lever detachably attached to one of the outer beams of the harrow; a lever detachably attached to the other outer beam of the harrow; means comprising a slot and a notch, and a pin to engage said notch, associated with said levers for adjustably connecting them together in the form of a toggle; and means to detachably secure the toggle in its final holding position.

3. In a knockdown harrow capable of being readily assembled and disassembled without the use of a bolt, nut or cotter pin, the combination of a plurality of harrow beams provided with hook-shaped members permanently secured thereto on one side and having loop-like members permanently secured thereto on the other side with which said hook-shaped members may engage; a lever provided with a hook detachably engaging one of the loop-like members on one of the outer harrow beams; a lever provided with a hook detachably engaging one of the loop-like members on the other outer harrow beam; notched means associated with said levers to facilitate the formation of a toggle therefrom; and means to secure the toggle in its holding position when formed.

4. In a knockdown harrow capable of being readily assembled and dis-assembled without the use of a bolt, nut or cotter pin, the combination of a plurality of harrow beams provided with hook-shaped members permanently secured thereto on one side and having loop-like members permanently secured thereto on the other side with which said hook-shaped members may engage; a lever provided with a hook detachably engaging one of the loop-like members on one of the outer harrow beams; a lever provided with a hook detachably engaging one of the loop-like members on the other outer harrow beam; means comprising a slot and a notch, and a pin to engage said notch, associated with said levers to facilitate the formation of a toggle therefrom; and means to detachably secure the toggle in its holding position when formed.

5. In a knockdown harrow, the combination of a plurality of harrow beams detachably attached together; a pair of toggle levers detachably attached to the outer beams of said harrow; a pin and a plurality of notches adapted to be engaged by said pin associated with said levers for pivotally securing said levers in the form of a toggle; and readily detachable means for securing said toggle in its holding position.

6. In a knockdown harrow, the combination of a plurality of harrow beams detachably attached together; a pair of toggle levers detachably attached to the outer beams of said harrow; an eye and a slot carried by one of said levers adapted to receive the end of the other lever; a pin and a plurality of notches adapted to be engaged by said pin associated with said levers for pivotally securing said levers in the form of a toggle; and readily detachable means for securing said toggle in its holding position.

7. In a knockdown harrow the combination of a plurality of harrow beams flexibly secured together; a plurality of levers secured to a pair of said beams; and notched means associated with said levers by which they may be joined together to form toggles of different lengths, whereby the flexibility of the harrow may be varied.

8. In a knockdown harrow the combination of a plurality of harrow beams detachably and flexibly secured together; a pair of levers detachably secured to the outer pair of beams of said harrow; and notched means associated with said levers adapted to so join the latter as to form toggles which when in their holding positions will so dispose said outer beams as to vary the flexibility between the beams of said harrow.

In testimony whereof I affix my signature.

EDGAR D. JONES.